(12) United States Patent
Falk (10) Patent No.: US 12,301,586 B2
(45) Date of Patent: May 13, 2025

(54) METHOD AND APPARATUSES FOR AUTHENTICATING A DATA STREAM

(71) Applicant: SIEMENS AKTIENGESELLSCHAFT, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 448 days.

(21) Appl. No.: 16/098,460

(22) PCT Filed: Mar. 28, 2017

(86) PCT No.: PCT/EP2017/057283
§ 371 (c)(1),
(2) Date: Nov. 2, 2018

(87) PCT Pub. No.: WO2017/190890
PCT Pub. Date: Nov. 9, 2017

(65) Prior Publication Data
US 2020/0322354 A1    Oct. 8, 2020

(30) Foreign Application Priority Data

May 3, 2016 (DE) .......................... 102016207642.6

(51) Int. Cl.
*H04L 9/40*   (2022.01)
*H04L 9/32*   (2006.01)
*H04W 12/106* (2021.01)

(52) U.S. Cl.
CPC .......... *H04L 63/123* (2013.01); *H04L 9/3239* (2013.01); *H04L 9/3247* (2013.01);
(Continued)

(58) Field of Classification Search
CPC ... H04L 63/123; H04L 9/3239; H04L 9/3247; H04L 63/065; H04L 63/126;
(Continued)

(56) References Cited

U.S. PATENT DOCUMENTS 4,237,553 A * 12/1980 Larsen .................... H04L 12/43
                                                                  370/458
7,200,767 B2 * 4/2007 Jonnalagadda ....... H04J 3/0691
                                                                  713/400
(Continued)

FOREIGN PATENT DOCUMENTS

CN       101473622 A     7/2009
CN       102202303 A     9/2011
(Continued)

OTHER PUBLICATIONS

Tong et al. (Astaggered-Channel-Cluster Approach to Support VIDEOMULTICAST Handoff in Wireless Networks, ICME 2008, 4 pages) (Year: 2008).*
(Continued)

*Primary Examiner* — Oleg Korsak
(74) *Attorney, Agent, or Firm* — Schmeiser, Olsen & Watts LLP (57) ABSTRACT

Provided is a method for generating a data stream, the transmitter of which is authenticated. The method includes calculating at least one first item of authentication information, wherein the at least one first item of authentication information is generated from a first item of validation information in each case using a cryptographic one-way function. The method includes storing the at least one first item of authentication information in a first data element of the data stream in each case. The method includes transmitting the particular first data element to at least one receiver. The method includes storing the particular first item of validation information in a second data element of the data (Continued)

stream in each case. The method includes transmitting the particular second data element to the at least one receiver.

14 Claims, 4 Drawing Sheets

(52) U.S. Cl.
CPC .......... *H04L 63/065* (2013.01); *H04L 63/126* (2013.01); *H04W 12/106* (2021.01)

(58) Field of Classification Search
CPC . H04L 2209/38; H04L 63/08; H04L 63/0428; H04W 12/1006; H04W 12/106; G06F 21/445
See application file for complete search history.

(56) References Cited

U.S. PATENT DOCUMENTS

| | | | | |
|---|---|---|---|---|
| 7,266,682 B2* | 9/2007 | Euchner | ............. | H04L 63/0236 |
| | | | | 713/151 |
| 8,135,958 B2* | 3/2012 | Greco | ................. | H04L 9/3236 |
| | | | | 380/255 |
| 8,300,811 B2 | 10/2012 | Georgiades et al. | | |
| 8,531,247 B2 | 9/2013 | Dichtl | | |
| 8,683,572 B1* | 3/2014 | Mahalingaiah | ....... | H04L 63/126 |
| | | | | 726/10 |
| 8,694,789 B2* | 4/2014 | Chapman | ............. | G06F 21/645 |
| | | | | 380/278 |
| 8,843,761 B2 | 9/2014 | Meyer et al. | | |
| 8,892,616 B2 | 11/2014 | Dichtl | | |
| 8,904,183 B2 | 12/2014 | Bellur et al. | | |
| 8,959,155 B1* | 2/2015 | Kwok | ................. | H04L 12/4633 |
| | | | | 709/205 |
| 9,147,088 B2 | 9/2015 | Falk et al. | | |
| 10,929,845 B2* | 2/2021 | Li | ................... | G06Q 20/38215 |
| 2003/0005284 A1* | 1/2003 | Euchner | ............... | H04M 7/006 |
| | | | | 713/152 |
| 2003/0120932 A1* | 6/2003 | Epstein | ................ | H04L 9/3236 |
| | | | | 713/181 |
| 2004/0092310 A1* | 5/2004 | Brosnan | ................ | G06F 21/606 |
| | | | | 463/42 |
| 2004/0128578 A1* | 7/2004 | Jonnalagadda | ....... | H04J 3/0691 |
| | | | | 713/400 |
| 2004/0259529 A1* | 12/2004 | Suzuki | ................ | H04W 12/108 |
| | | | | 455/411 |
| 2005/0005093 A1* | 1/2005 | Bartels | ................... | H04L 67/12 |
| | | | | 713/150 |
| 2005/0044354 A1* | 2/2005 | Hagerman | .......... | H04L 67/1097 |
| | | | | 713/160 |
| 2005/0249225 A1* | 11/2005 | Singhal | .............. | H04L 63/1466 |
| | | | | 370/401 |
| 2006/0026433 A1* | 2/2006 | Montenegro | ........... | G06F 21/31 |
| | | | | 713/181 |
| 2007/0116266 A1* | 5/2007 | Greco | ............... | H04L 9/3236 |
| | | | | 380/28 |
| 2007/0279227 A1* | 12/2007 | Juels | ..................... | H04L 9/3226 |
| | | | | 340/572.1 |
| 2008/0037783 A1* | 2/2008 | Kim | ..................... | H04N 21/435 |
| | | | | 380/241 |
| 2008/0125043 A1* | 5/2008 | Karmanenko | .... | H04W 12/1204 |
| | | | | 455/41.2 |
| 2008/0212582 A1* | 9/2008 | Zwart | ................... | H04L 1/1692 |
| | | | | 370/390 |
| 2009/0210707 A1* | 8/2009 | De Lutiis | .............. | H04L 63/123 |
| | | | | 713/170 |
| 2010/0014670 A1* | 1/2010 | Li | ........................ | H04L 9/3271 |
| | | | | 380/255 |
| 2010/0100737 A1* | 4/2010 | Chapman | ............. | H04L 9/3247 |
| | | | | 713/168 |
| 2010/0250053 A1* | 9/2010 | Grill | ....................... | H04L 12/40 |
| | | | | 701/31.4 |
| 2011/0116381 A1* | 5/2011 | Nikander | ............ | H04L 63/1458 |
| | | | | 370/236 |
| 2011/0173209 A1* | 7/2011 | Fortier | .................... | H04L 69/04 |
| | | | | 707/747 |
| 2011/0238997 A1* | 9/2011 | Bellur | .................. | H04L 9/3242 |
| | | | | 713/168 |
| 2011/0312284 A1* | 12/2011 | Falk | ................... | H04L 63/1458 |
| | | | | 455/68 |
| 2012/0128151 A1* | 5/2012 | Boehm | ................ | H04N 21/654 |
| | | | | 380/42 |
| 2012/0213368 A1* | 8/2012 | Falk | ...................... | H04L 9/3271 |
| | | | | 380/270 |
| 2012/0260088 A1* | 10/2012 | Fries | ..................... | H04L 63/168 |
| | | | | 713/155 |
| 2013/0080780 A1* | 3/2013 | Mister | ................... | G07F 7/1008 |
| | | | | 713/168 |
| 2013/0132730 A1* | 5/2013 | Falk | ...................... | H04L 9/3215 |
| | | | | 713/181 |
| 2013/0156180 A1 | 6/2013 | Hess | | |
| 2013/0167234 A1* | 6/2013 | Falk | ........................ | H04L 63/12 |
| | | | | 726/23 |
| 2014/0245385 A1* | 8/2014 | Singhal | ................ | H04L 63/126 |
| | | | | 726/3 |
| 2015/0074404 A1* | 3/2015 | Kasper | ................. | H04L 63/123 |
| | | | | 713/170 |
| 2015/0264080 A1 | 9/2015 | BuBer et al. | | |
| 2015/0341343 A1 | 11/2015 | Dichtl et al. | | |
| 2016/0006734 A1* | 1/2016 | Huang | ................ | H04L 63/0853 |
| | | | | 726/4 |
| 2016/0292458 A1* | 10/2016 | Serret-Avila | ........ | H04L 63/0428 |
| 2016/0315963 A1* | 10/2016 | Fiaschi | ................ | H04L 63/123 |
| 2016/0380770 A1* | 12/2016 | Whitmer | ............... | H04L 9/0643 |
| | | | | 713/181 |
| 2017/0331836 A1* | 11/2017 | De Souza Schwartz | ..................... | |
| | | | | H04L 63/126 |
| 2018/0262466 A1* | 9/2018 | Atad | ................... | H04L 63/0245 |

FOREIGN PATENT DOCUMENTS

| | | |
|---|---|---|
| CN | 103053131 A | 4/2013 |
| CN | 104320778 A | 1/2015 |
| EP | 2870565 A1 | 5/2015 |
| EP | 2891102 A1 | 7/2015 |
| EP | 2605445 B1 | 9/2015 |
| WO | 2009122165 A1 | 10/2009 |
| WO | WO2015/018594 | 2/2015 |

OTHER PUBLICATIONS

AUTOSAR (SOME/IP Service Discovery Protocol Specification AUTOSAR FO Release 1.0.0, 2016, 74 pages) (Year: 2016).*
Sencun Zhu et al: "LEAP: Efficient Security Mechanisms for Large Scale Distributed Sensor Networks", ACM Transactions on Sensor Networks, vol. 2, No. 4, pp. 500-528, XP055295131, 2 Penn Plaza, Suite 701 New York NY 10121-0701 USA; ISSN: 1550-4859, DOI: 10.1145/1218556.1218559; Section 2 to Section 7; 2006.
Adrian Perrig, Ran Canetti, J. D. Tygar, Dawn Song, "The TESLA Broadcast Authentication Protocol", In CryptoBytes, 5:2, Summer/Fall 2002, pp. 2-13.
Challal Yacine et al: "A taxonomy of multi cast data origin authentication: Issues and solutions"; IEEE Communi Cations Surveys, IEEE, New York, NY; vol. 2; No. 3; pp. 34-57; ISSN: 1553-877X; XP011285495; 2004.
PCT International Search Report and Written Opinion of International Searching Authority mailed Jul. 4, 2017 corresponding to PCT International Application No. PCT/EP 2017/057283 filed Mar. 28, 2018.
1 Examination Report in related European Patent Application No. 17 715 648.6, dated Jan. 3, 2020. 6 pages.

* cited by examiner

METHOD AND APPARATUSES FOR AUTHENTICATING A DATA STREAM

CROSS-REFERENCE TO RELATED APPLICATIONS

This application claims priority to PCT Application No. PCT/EP2017/057283, having a filing date of Mar. 28, 2017, based off of German Application No. 102016207642.6, having a filing date of May 3, 2016, the entire contents both of which are hereby incorporated by reference.

FIELD OF TECHNOLOGY

The following relates to a method and apparatuses for safeguarding a message transmission.

BACKGROUND

When messages are transmitted via a communication network, there is the risk that the transmitted messages will be manipulated by virtue of the communication connection being taken over by an unauthorized party or the messages being manipulated. There is therefore a need to verify the authenticity of a sender and/or to verify the integrity of the messages.

The document U.S. Pat. No. 8,531,247 B2, the document U.S. Pat. No. 8,892,616 B2, the document U.S. Pat. No. 8,300,811 B2, the document U.S. Pat. No. 9,147,088 B2, the document EP 2 605 445 B1, the document EP 2 870 565 A1, the document EP 2 891 102 A1 and the document U.S. Pat. No. 8,843,761 B2 are known from the prior art.

SUMMARY

An aspect relates to a method and apparatuses that permit a check on the integrity of the messages and/or authenticity of the message sender to be performed.

According to a first aspect, the invention relates to a method for producing a data stream whose sender is authenticable, having the method steps of:
  computing at least one first piece of authentication information, wherein the at least one first piece of authentication information is generated from a respective first piece of validation information by means of a cryptographic one way function;
  storing the at least one first piece of authentication information in a respective first data element of the data stream;
  transmitting the respective first data element to at least one receiver;
  storing the respective first piece of validation information in a respective second data element of the data stream; and
  transmitting the respective second data element to the at least one receiver.

A piece of "validation information" can be understood in connection with the patent application to mean a random number, a single value (nonce) and/or a continuously incremented/decremented number, for example. Alternatively and/or additionally, the piece of validation information can comprise or be formed on the basis of, by way of example, a sender identifier and/or a check value and/or further information, for example from a header of a data element, the check value being computed from the content of the data element, for example. A piece of validation information is thus in particular not a key from an asymmetric cryptographic method. The random number and/or the continuously incremented/decremented number can be generated afresh in particular for a respective data element.

A "data element" can be understood in connection with the patent application to mean a data packet or a message, for example. The data packet or the message can be transmitted to one or more receivers in particular by means of a broadcast network protocol. The respective data elements are in particular different data elements (separate data elements) that are preferably transmitted and/or received with staggered timing.

A "data stream" can be understood in connection with the patent application to mean the sending of information by means of multiple data elements, for example. A data stream may be a video stream transmitted by a streaming server to one or more streaming clients by means of the UDP protocol, for example. The individual UDP packets are in this case in particular the data elements of the method according to embodiments of the invention. A data stream may generally be provided by a series of data elements. By way of example, multiple or all data elements of the data stream in this case contain a piece of authentication information relating to the respective data element, and a piece of validation information that is associated with a piece of authentication information from a data element transmitted in the past and that is usable for verifying said piece of authentication information. The inventive protection of messages can in particular be applied to all data elements of a data stream or to a prescribed subset of the data elements of the data stream.

A "cryptographic one way function" can be understood in connection with the present case to mean a cryptographic hash function, for example.

A "checksum" can be understood in connection with the present case to mean a cryptographic checksum, for example. The checksum can be formed using a cyclic redundancy check (CRC), a hash, a cryptographic hash, a message authentication code (MAC) or a digital signature, for example. The checksum can be formed, by way of example, for a portion of a data element, for example the first data element, or for the whole data element. The checksum is then in particular added to the data element before the data element is transmitted by the sender, for example.

The method can be used by a receiver, for example, to reliably check that a received message comes from the same sender as a message received in the past. The method is usable for a communication with a multiplicity of receivers, for example. There is in particular no specific start of a session required: multiple receivers can in particular jump to respective different positions in a series of sent data elements. There is thus in particular no receiver-specific synchronization required, and there is no restriction to being able to perform self-synchronization only at particular times. The method in particular requires no cryptographic key at a receiver end. As such, complex key management (key distribution, key update) is not required, for example. By contrast, conventional digital signature in particular requires only efficiently performable cryptographic operations, for example.

In particular the relationship between a piece of validation information and a piece of authentication information can be implemented in different ways, for example. The respective piece of validation information may be associated with at least one respective piece of authentication information or with multiple respective pieces of authentication information, for example. Alternatively, the respective piece of validation information may be associated with a respective single piece of authentication information.

Preferably, the transmission of the second data element, comprising a piece of validation information, is effected in a time window or at a time determined on the basis of the transmission of the first data element, comprising a piece of authentication information. In other words, this in particular means that, by way of example, a data element having a piece of validation information is sent at a time after the data element having the associated piece of authentication information.

Preferably, a receiver accepts the first data element as valid if in particular the second data element is received in a time window determined on the basis of the time of reception of the first data element, for example. Additionally, in particular the receiver checks the validity of the piece of authentication information at the first data element using the piece of validation information of the second data element, for example.

The method can be employed for car-to-car communication, for example, in the field of autonomous driving so that vehicles (passenger vehicles and/or trucks) exchange position information for collision detection and collision avoidance, for example. Similarly, the method can be used for a publish-subscribe communication or a control communication, for example, in which in particular a sender transmits a series of control messages and/or status messages and/or sensor messages to a multiplicity of receivers wirelessly or by wire. The transmission is preferably a multicast communication or a broadcast communication.

In a first embodiment of the method, a respective further first piece of authentication information is computed, wherein the respective further first piece of authentication information is generated from a respective further first piece of validation information by means of the cryptographic one way function, wherein the respective further first piece of authentication information is stored in a respective further first data element and is transmitted to the at least one receiver, wherein the respective further first piece of validation information is stored in the second data element.

The method can be used to introduce the piece of authentication information and/or validation information into the data stream repeatedly, that is to say in different data elements, for example, so that a receiver can authenticate the sender repeatedly during a data transmission. A data element can in particular contain multiple pieces of authentication information and multiple pieces of validation information. The multiple pieces of validation information of a data element preferably relate to a plurality of pieces of authentication information of different data elements, in particular data elements transmitted at times in the past. In this case, in particular a piece of validation information may have a respective associated different validity time window for the time of reception of the respective piece of authentication information transmitted in the past or of the data element comprising the piece of authentication information.

In a further embodiment of the method, at least one second piece of authentication information is computed, wherein the at least one second piece of authentication information is generated from a respective second piece of validation information by means of the cryptographic one way function, wherein the at least one second piece of authentication information is stored in the respective second data element of the data stream, wherein the respective second piece of validation information is stored in a respective third data element of the data stream, wherein the respective third data element is transmitted to the at least one receiver.

As a result, it is in particular possible for the pieces of validation information and authentication information to be interlinked or interlocked, and increased security of the method is achieved, for example.

In a further embodiment of the method, one of the data elements comprises at least two pieces of authentication information, wherein respective different data elements comprise an associated piece of validation information for the at least two pieces of authentication information.

As a result, by way of example, the first data element together with the second data element can be used to authenticate the sender, in particular it is thus possible for a data element to comprise multiple pieces of authentication information for multiple respective different data elements transmitted later, for example. As a result, a reliability of the method can be improved further.

In a further embodiment of the method, further pieces of authentication information are computed in accordance with the at least one first piece of authentication information, wherein the further pieces of authentication information and respective further pieces of validation information are stored and transmitted in the respective third data element and/or further data elements of the data stream, wherein the storing and transmitting of the further pieces of authentication information and of the respective further pieces of validation information is effected in accordance with the storing and transmitting of the first data element and the second data element and/or the storing and transmitting of the second data element and the third data element.

As a result, a piece of validation information and/or authentication information can be inserted in all data elements of the data stream and/or a predefined number of data elements of the data stream and/or a predefined number of data elements on the basis of a length of the data stream and/or a predefined number of data elements on the basis of a transmission period of the data stream, for example. As a result, the reliability and security of the method can be improved further.

In a further embodiment of the method, the first data element comprises a first checksum for at least one portion of the first data element, and the second data element comprises a first secret for a check on the first checksum.

As a result, an integrity of the content of the first data element can be checked, for example. By way of example, further checksums can be formed for and added to respective further data elements of the data stream. By way of example, further secrets for checking the respective checksum are then inserted into subsequently transmitted data elements. The method can be applied to a portion of the data elements of the data stream or can be applied to preferably all data elements of the data stream, for example.

In one variant, in particular at least individual data elements additionally have a conventional cryptographic checksum authenticating the sender. This may be a digital signature or a cryptographic message authentication code, for example. As a result, it is in particular possible for a receiver to identify the sender of a (self-authenticating) data stream preferably in manipulation-proofed fashion. In this case, it is in particular necessary for only individual data elements to have a conventional cryptographic checksum proving the identity of the sender. Nevertheless, the whole data stream, i.e. the series of data elements, can be associated with the identified sender, for example.

The series of data elements of a data stream is preferably transmitted via the same data transmission channel. A data transmission channel may be a radio transmission link, a data transmission line, a data communication network or a transmission path of a data communication network, for example. However, it is likewise possible for data elements of a data stream to be transmitted via different data transmission routes or to be coded or modulated in different ways, for example. By way of example, it is also conceivable for the data elements to be transmitted at a different signal level or transmission power or at a different transmission frequency.

According to a further aspect, embodiments of the invention relates to a method for authenticating a sender of a data stream by means of a receiver, having the method steps of:
- receiving at least one first data element of the data stream, wherein the at least one first data element comprises a respective first piece of authentication information;
- receiving at least one second data element of the data stream, wherein the at least one second data element comprises a respective first piece of validation information for the respective first piece of authentication information;
- computing a respective first piece of local authentication information, wherein the respective first piece of local authentication information is generated from the respective first piece of validation information by means of a cryptographic one way function;
- comparing the respective first piece of local authentication information with the respective first piece of authentication information, wherein the sender is authenticated if the respective first piece of local authentication information and the respective first piece of authentication information have sufficient concordance.

The method can be used by a receiver, for example, to reliably check that a received message comes from the same sender as a message received in the past. The method is usable for a communication with a multiplicity of receivers, for example. There is in particular no specific start of a session required: multiple receivers can in particular jump to respective different positions in a series of sent data elements. There is thus in particular no receiver-specific synchronization required, and there is no restriction to being able to perform self-synchronization only at particular times. The method in particular requires no cryptographic key at a receiver end. As such, complex key management (key distribution, key update) is not required, for example. By contrast, conventional digital signatures in particular require only efficiently performable cryptographic operations, for example.

In particular the relationship between a piece of validation information and a piece of authentication information can be implemented in different ways, for example. The respective piece of validation information may be associated with at least one respective piece of authentication information or with multiple respective pieces of authentication information, for example. Alternatively, the respective piece of validation information may be associated with a respective single piece of authentication information.

As a result of the piece of validation information being able to contain a checksum for the first data element, for example, it is also additionally a simple matter for the integrity of the previous message to be verified, for example.

The receiver accepts in particular the first data element as valid if the second data element is received in a time window determined on the basis of the time of reception of the first data element. Additionally, the receiver verifies the validity of the piece of authentication information of the first data element using the piece of validation information of the second data element, for example.

In other words, this means in particular that, by way of example, a data element having a piece of validation information is received at a time after the data element having the associated piece of authentication information.

In a first embodiment of the method, the second data element comprises a multiplicity of first pieces of validation information, wherein a respective further first data element comprises a respective further first piece of authentication information, wherein a respective further first piece of local authentication information is computed for the respective further first piece of authentication information in accordance with the computing of the respective first piece of local authentication information, wherein the respective further first piece of authentication information is compared with the respective further local first piece of authentication information thereof in accordance with the comparing of the respective first piece of local authentication information with the respective first piece of authentication information.

In a further embodiment of the method, the at least one second data element comprises a respective second piece of authentication information, wherein at least one third data element is received, wherein the at least one third data element comprises a respective second piece of validation information, wherein a respective second piece of local authentication information is computed, wherein the respective second piece of local authentication information is generated from the respective second piece of validation information by means of the cryptographic one way function, wherein the respective second piece of local authentication information is compared with the respective second piece of authentication information, wherein the sender is authenticated if the respective second piece of local authentication information and the respective second piece of authentication information have sufficient concordance.

In a further embodiment of the method, the data elements comprise at least two pieces of authentication information, wherein respective different data elements comprise an associated piece of validation information for the at least two pieces of authentication information, wherein a respective further piece of local authentication information is computed for the respective associated piece of validation information in accordance with the computing of the respective first piece of local authentication information, wherein the at least two pieces of authentication information are compared with the respective further pieces of local authentication information in accordance with the comparing of the respective first piece of local authentication information with the respective first piece of authentication information.

In a further embodiment of the method, the at least one third data element and/or further data elements comprises a respective further piece of authentication information, wherein a respective second piece of local authentication information is computed for the respective further piece of authentication information in accordance with the computing of the respective first piece of local authentication information, wherein the respective further piece of authentication information is compared with the respective second piece of local authentication information thereof in accordance with the comparing of the respective first piece of local authentication information with the respective first piece of authentication information.

In a further embodiment of the method, the first data element comprises a first checksum for at least one portion of the first data element, wherein the second data element comprises a first secret and wherein an integrity of the at least one portion of the first data element is checked on the basis of the first checksum and the first secret.

According to a further aspect, embodiments of the invention relates to a generation apparatus for producing a data stream whose sender is authenticable, having:

a first computation module for computing at least one first piece of authentication information, wherein the at least one first piece of authentication information is generated from a respective first piece of validation information by means of a cryptographic one way function;

a first memory module for storing the at least one first piece of authentication information in a respective first data element of the data stream;

a first transmission module for transmitting the respective first data element to at least one receiver;

a second memory module for storing the respective first piece of validation information in a respective second data element of the data stream; and a second transmission module for transmitting the respective second data element to the at least one receiver.

The first memory module and the second memory module may also be designed as an integral memory module, for example. Similarly, the first transmission module and the second transmission module may be designed as an integral transmission module.

According to a further aspect, embodiments of the invention relates to an authentication apparatus for authenticating a sender of a data stream by means of a receiver, having:

a first reception module for receiving at least one first data element of the data stream, wherein the at least one first data element comprises a respective first piece of authentication information;

a second reception module for receiving at least one second data element of the data stream, wherein the at least one second data element comprises a respective first piece of validation information for the respective first piece of authentication information;

a second computation module for computing a respective first piece of local authentication information, wherein the respective first piece of local authentication information is generated from the respective first piece of validation information by means of a cryptographic one way function;

a first comparison module for comparing the respective first piece of local authentication information with the respective first piece of authentication information, wherein the sender is authenticated if the respective first piece of local authentication information and the respective first piece of authentication information have sufficient concordance.

The first reception module and the second reception module may also be designed as an integral reception module, for example.

According to a further aspect, embodiments of the invention relates to a system comprising:

a first communication partner, which has a generation apparatus according to embodiments of the invention;

at least one second communication partner, which has an authentication apparatus according to embodiments of the invention, wherein the first communication partner and the second communication partner are communicatively connected to one another via a communication network.

In addition, a computer program product (non-transitory computer readable storage medium having instructions, which when executed by a processor, perform actions) having program commands for performing the cited method according to embodiments of the invention is claimed.

Additionally, a variant of the computer program product having program commands for configuring a production device, for example a 3D printer or a device suitable for producing processors and/or devices and/or apparatuses, is claimed, wherein the production device is configured using the program commands such that the cited apparatuses according to embodiments of the invention are produced.

Furthermore, a provision apparatus for storing and/or providing the computer program product is claimed. The provision apparatus is a data storage medium storing and/or providing the computer program product, for example. Alternatively and/or additionally, the provision apparatus is a network service, a computer system, a server system, in particular a distributed computer system, a cloud-based computer system and/or virtual computer system storing and/or providing the computer program product preferably in the form of a data stream, for example.

This provision is effected as a download in the form of a program data block and/or command data block, preferably as a file, in particular as a download file, or a data stream, in particular as a download data stream, of the complete computer program product, for example. This provision can alternatively be effected as a partial download consisting of multiple portions and in particular downloaded via a peer-to-peer network or provided as a data stream, for example. Such a computer program product is read into a system by using the provision apparatus in the form of the data storage medium, for example, and executes the program commands, so that the method according to embodiments of the invention is executed on a computer or configures the production device such that it produces the apparatuses according to embodiments of the invention.

BRIEF DESCRIPTION

Some of the embodiments will be described in detail, with reference to the following figures, wherein like designations denote like members, wherein.

In the figures, elements having the same function are provided with the same reference signs, unless indicated otherwise.

DETAILED DESCRIPTION

The exemplary embodiments that follow are preferably implemented by means of a processor and/or a memory module, unless indicated otherwise.

More specifically, the components and apparatuses of embodiments of the invention, unless indicated otherwise or already mentioned, can each have a processor and/or memory device of their own in order to implement and/or carry out the method. The components can also have further typical devices known to a person skilled in the art. By way of example, input devices and/or display devices.

The exemplary embodiments that follow relate in particular to a communication by a first communication partner, for example a sender, transmitting the data elements to at least one second communication partner, for example a client, by means of a communication network, for example an Ethernet network.

Figure 1:
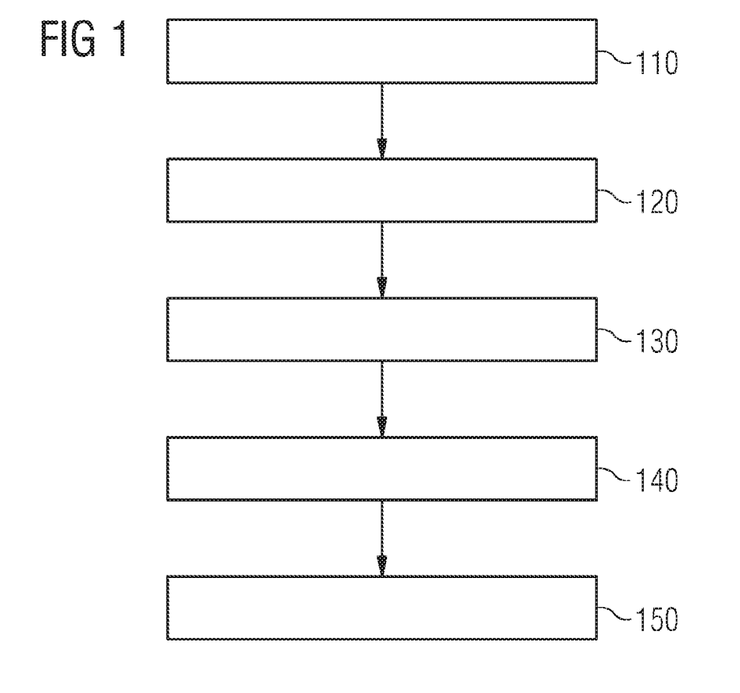
FIG. 1 shows a flowchart for a first exemplary embodiment from the point of view of the sender.
Figure 2:
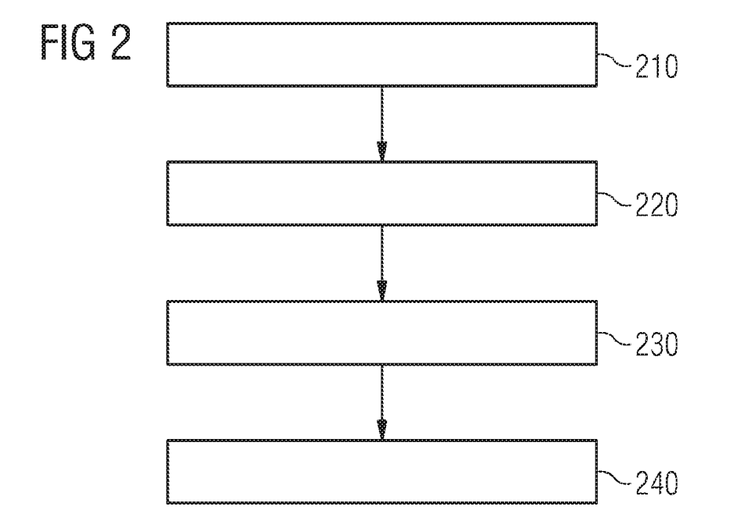
FIG. 2 shows a flowchart for the first exemplary embodiment from the point of view of the receiver.
Figure 3:
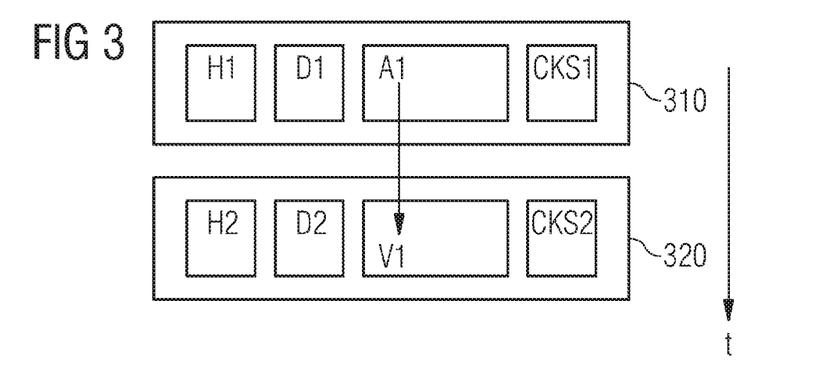
FIG. 3 shows data elements of the first exemplary embodiment.

FIG. 1 shows a flowchart for a first exemplary embodiment of a method according to embodiments of the invention from the point of view of the sender. FIG. 2 shows a flowchart for the first exemplary embodiment of a method according to embodiments of the invention from the point of view of the receiver. FIG. 3 shows two data elements of the first exemplary embodiment by way of example.

More specifically, FIG. 1 shows a method for producing a data stream by means of a sender.

The method comprises a first method step for computing 110 a first piece of authentication information, wherein the first piece of authentication information is generated by means of a cryptographic one way function and a first piece of validation information.

The method comprises a second method step for storing 120 the first piece of authentication information in a first data element of the data stream.

The method comprises a third method step for transmitting 130 the first data element to at least one receiver.

The method comprises a fourth method step for storing 140 the first piece of validation information in a second data element of the data stream.

The method comprises a fifth method step for transmitting 150 the second data element to the at least one receiver.

The data elements are sent in succession, for example, that is to say first of all the first data element, then the second data element, etc.

More specifically, FIG. 2 shows a method for authenticating a sender of a data stream by means of a receiver.

The method comprises a sixth method step for receiving 210 at least one first data element of the data stream, wherein the at least one first data element comprises a respective first piece of authentication information.

The method comprises a seventh method step for receiving 220 at least one second data element of the data stream, wherein the at least one second data element comprises a respective first piece of validation information for the respective first piece of authentication information.

The method comprises an eighth method step for computing 230 a respective first piece of local authentication information, wherein the respective first piece of local authentication information is generated from the respective first piece of validation information by means of a cryptographic one way function.

The method comprises a ninth method step for comparing 240 the respective first piece of local authentication information with the respective first piece of authentication information, wherein the sender is authenticated if the respective first piece of local authentication information and the respective first piece of authentication information have sufficient concordance.

The method depicted in FIG. 1-3 is preferably implemented in computer-aided fashion and in particular uses network interfaces for transmitting and receiving the data elements.

More specifically, FIG. 3 shows the first data element 310 and the second data element 320 by way of example. FIG. 3 additionally shows a time line t illustrating that the data elements 310, 320 are transmitted from the sender to the receiver in succession, in particular with staggered timing. The sender can send these data elements 310, 320 to multiple receivers, for example in a broadcast communication. Additionally, the method can be applied to further data elements of the data stream.

More specifically, the first data element 310 comprises a first header H1, first user data D1, the first piece of authentication information A1 and a first checksum CKS1, wherein the checksum may be formed for the first header H1, the first user data D1 and the first piece of authentication information A1 or just for the first header H1 and the first user data D1.

The first header H1 and the other headers mentioned later on can comprise an identifier of the sender (sender ID) and/or an identifier of a data element (data element ID, e.g. counter, time value, nonce, random value), the identifier again being able to be part of the piece of validation information. The piece of validation information can therefore in particular relate to the entire data element or to a portion of the data element. These may be header, data, identifier of a data element for a cryptographically generated data element ID, a checksum or a combination of this information, for example.

The second data element 320 comprises a second header H2, second user data D2, the first piece of validation information V1 and a second checksum CKS2, wherein the second checksum CKS2 can be formed for the second header H2, the second user data D2 and the first piece of validation information V1 or just for the second header H2 and the second user data D2. In other words, the checksums can be formed for the whole data element or for selected data fields of the data element.

As explained in the method according to embodiments of the invention, the first data element 310 is transmitted first of all and then the second data element 320.

The method according to embodiments of the invention can therefore be used in particular to identify/authenticate the sender of a data stream (series of data elements) comprising a series of data elements (block, message, packet) as the same sender that sent the preceding blocks.

The method can be performed by multiple receivers, which means that the method is in particular suitable for a multicast/broadcast communication and a publish-subscribe communication.

In other words, the basic concept involves the first data element of the sender comprising the first piece of authentication information. The piece of authentication information can be computed using $C=H(V)$, for example, where V is a piece of validation information comprising a random value, for example, and H is a cryptographic one way function, e.g. SHA256, SHA3, HMAC-SHA256.

The piece of authentication information can be validated only by the one that knows the piece of validation information. In a subsequent data element, for example the second data element, the piece of validation information is provided by the sender. As a result, the first data element having the piece of authentication information and the second data element having the piece of validation information are associable with the same sender, even if the sender is not authenticated in a conventional manner.

The sender thus sends a data stream comprising a series of such data elements (block, packet, message) that each contain a piece of authentication information and a piece of validation information for a data element, piece of authentication information, from the past, that is to say sent previously (at a previous time).

The receiver then checks whether the piece of validation information matches the associated, buffer-stored, piece of authentication information from the past, for example the piece of authentication information of the first data element.

Possible areas of application for the method are:
satellite communication (e.g. open service authentication of a GPS or Galileo satellite navigation service)
publish-subscribe communication (e.g. MQTT, XMPP, AMQP)
control communication (multicast/broadcast)
sensor networks, Internet of Things
continuous device authentication (the sender does not change during a transmission of a data stream)

In one variant, at least one respective value of the piece of validation information is recomputed, for example a new random number is generated, for each computation or generation of a piece of authentication information.

In a further variant, pieces of validation information are produced and transmitted in a single second data element for multiple first data elements having a respective first piece of authentication information. It is thus possible for the receiver to authenticate the sender of the multiple first data elements using the second data element.

Figure 4:
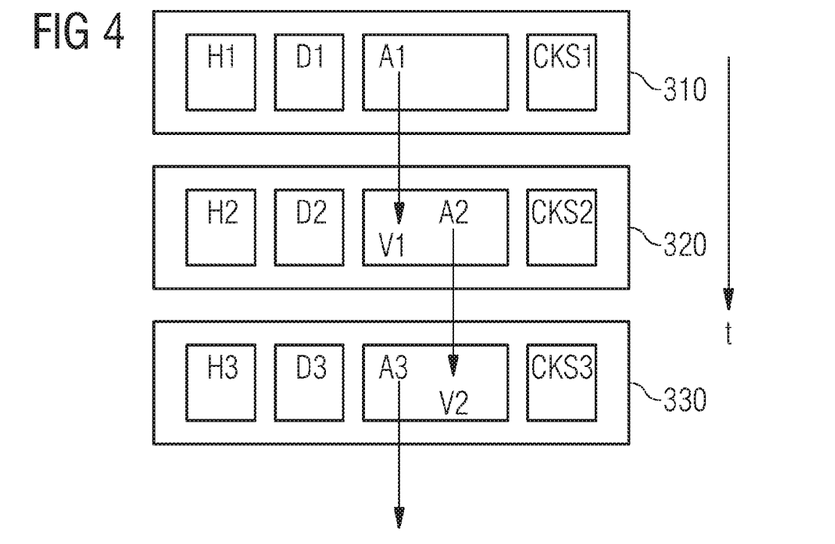
FIG. 4 shows a second exemplary.

FIG. 4 shows a second exemplary embodiment of a method according to embodiments of the invention. It depicts an extension of the method that has already been depicted in FIG. 1-3. Accordingly, the definitions from FIG. 1-3 also apply to FIG. 4.

More specifically, in this exemplary embodiment, at least one second piece of authentication information A2 is computed, wherein the at least one second piece of authentication information A2 is generated from a respective second piece of validation information V2 by means of the cryptographic one way function. In other words, a second piece of authentication information is generated analogously to the first piece of authentication information.

The at least one second piece of authentication information A2 is stored in the respective second data element 320 of the data stream and transmitted to the at least one receiver. The respective second piece of validation information V2 is then stored in a respective third data element 330 of the data stream and transmitted to the at least one receiver. The third data packet in this case in turn comprises, by way of example, a third piece of authentication information A3, for which a piece of validation information is transmitted in a subsequent data element, a third header, third user data and a third checksum, computed in accordance with the other checksums. The piece of authentication information is computed analogously to the first piece of authentication information.

At the receiver end, the at least one second data element 320 comprises the respective second piece of authentication information A2. The receiver then receives at least the third data element 330, wherein the at least one third data element 330 comprises the respective second piece of validation information V2.

The receiver then computes a respective second piece of local authentication information, wherein the respective second piece of local authentication information is generated from the respective second piece of validation information V2 by means of the cryptographic one way function.

The receiver then compares the respective second piece of local authentication information with the respective second piece of authentication information A2, wherein the sender is authenticated if the respective second piece of local authentication information and the respective second piece of authentication information A2 have sufficient concordance.

This interlinking or interlocking of messages by means of the pieces of authentication information A1, A2 and validation information V1, V2 can be continued for further data elements of the data stream, which means that in particular an absence of a data element or an insertion of a data element into the data stream by an unauthorized sender can be detected by the receiver.

Figure 5:
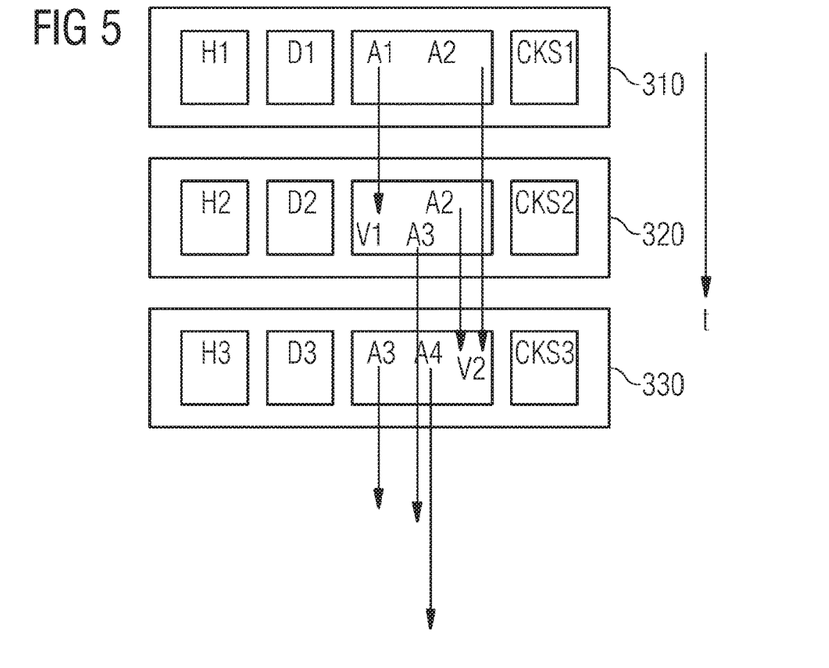
FIG. 5 shows a third exemplary embodiment.

FIG. 5 shows a third exemplary embodiment of a method according to embodiments of the invention. It depicts an extension of the method that has already been depicted in FIG. 1-4. Accordingly, the definitions from FIG. 1-4 also apply to FIG. 5, unless indicated otherwise.

In this exemplary embodiment, one of the data elements 310, 320, 330 comprises at least two pieces of authentication information, wherein different respective data elements comprise an associated piece of validation information for the at least two pieces of authentication information. In this exemplary embodiment, this means that the first data element 210 comprises a first piece of authentication information A1 and a second piece of authentication information A2.

The second data element 320 then comprises the second piece of authentication information A2, a third piece of authentication information A3 and the first piece of validation information V1.

The third data element 330 then comprises the third piece of authentication information A3, a fourth piece of authentication information A4 and the piece of validation information V2 associated with the second piece of authentication information A2.

The receiver receives the data elements comprising at least two pieces of authentication information. If a data element having the at least two pieces of authentication information, for example the first piece of authentication information A1 and the second piece of authentication information A2, has been received, then a subsequent data element, for example the first subsequent data element, contains the first piece of validation information V1 and a further subsequent data element, for example the second subsequent data element, contains the second piece of validation information.

The receiver then computes a respective further piece of local authentication information for the respective associated piece of validation information V1, V2 analogously to the computation of the respective first piece of local authentication information of the first exemplary embodiment.

The receiver then compares the at least two pieces of authentication information A1, A2 with the respective further pieces of local authentication information in accordance with the comparison of the respective first piece of local authentication information from the first exemplary embodiment with the respective first piece of authentication information.

The pieces of authentication information are computed analogously to the piece of authentication information in FIG. 1-3. The difference between this exemplary embodiment and the first exemplary embodiment is that a data element comprises two or more pieces of authentication information, wherein the subsequent data elements comprise a respective associated piece of validation information for authenticating the sender.

In the exemplary embodiment, a data element comprises two respective pieces of authentication information. If this data element is now sent with the two pieces of authentication information, then the first subsequent data element comprises the associated first piece of validation information for the first piece of authentication information. The second subsequent data element then comprises the associated second piece of validation information for the second piece of authentication information.

In other words, FIG. 5 in particular shows an exemplary embodiment in which a data element comprises a piece of authentication information for a future data element (complete data element or a portion of a data element). The future data element is provided (produced and/or transmitted) by a sender only at a later time.

Referring to the exemplary embodiment, the first piece of authentication information A1 can be computed as follows:

A1:=SHA256(first header H1|first useful data), wherein SHA256 (secure hash algorithm) is a one way function, in particular a cryptographic hash function.

The checksums, that is to say the first checksum CKS1, the second checksum CKS2 and the third checksum CKS3, are optional (cryptographic checksum).

The checksum can be formed using a cyclic redundancy check (CRC), a hash, a message authentication code (MAC) or a digital signature of the data element, for example.

The checksums, where present, are preferably computed for the whole content of the respective data element.

Figure 6:
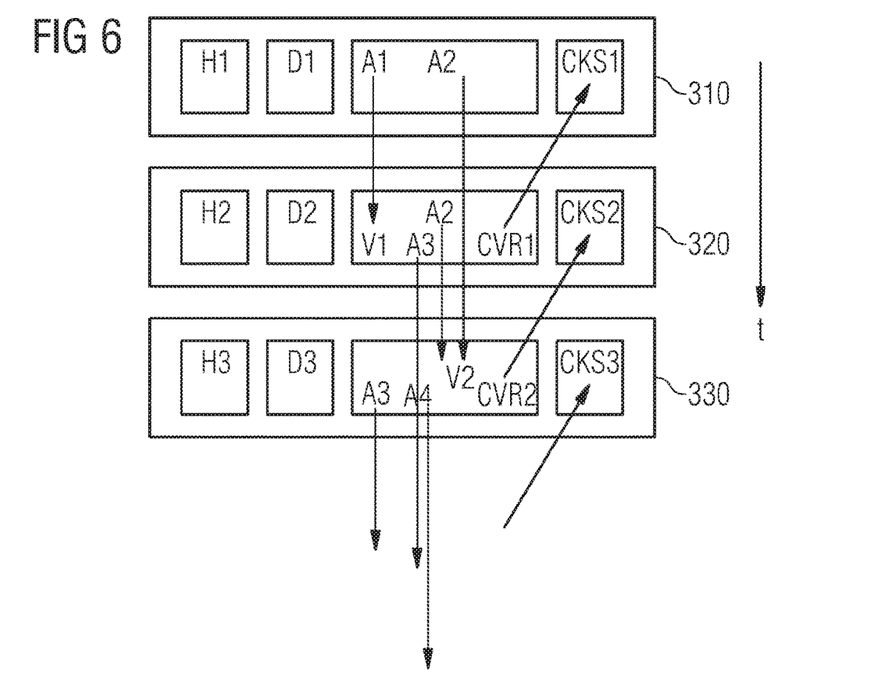
FIG. 6 shows a fourth exemplary embodiment.

FIG. 6 shows a fourth exemplary embodiment of a method according to embodiments of theinvention. More specifically, the exemplary embodiment shows how the method according to embodiments of the invention and the associated exemplary embodiments can be linked using a checksum method.

A checksum as checksum for a data element can be resolved in a future/subsequent data element. In this case, there is in particular no key required for a conventional cryptographic checksum.

Thus, by way of example, the first data element 310 is additionally used by the sender to store a first checksum CSK1 before it is transmitted.

A subsequent data element, for example the second data element 320, is then used to disclose a first secret CVR1 that can be used by the receiver retrospectively to verify the first checksum CSK1. The method can be repeated for the further data elements. The method in particular permits an integrity check on the individual data elements.

The method is similar to the Tesla protocol [1] in this case, but the secret keys do not have to be concatenated using a hash chain and there is also no need for an anchor value to be distributed using a separate key distribution mechanism.

More specifically, the methods can be used to achieve the following security aims:

verifiability of the message integrity (data are not manipulated) by the respective checksums CSK1, CSK2, CSK3 verifiability of the sender authenticity by the piece of authentication information and the piece of validation information Since only one way functions, in particular hash functions, are used and no encryption algorithm, the method is also advantageously employable when there are restrictions on use or export restrictions for encryption technology.

The method performs very well, since little time is needed for computing the piece of authentication information or the check value in comparison with encryption algorithms, since in particular no asymmetric cryptographic operations (e.g. digital signature) are carried out for each data element.

In one variant, some data elements may additionally be digitally signed. As a result, a receiver can then also (possibly with a delay) authenticate the sender in a conventional manner in a series of data elements, for example. If the sender has now been authenticated conventionally, preferably once, the method according to embodiments of the invention can be used by the receiver to verify that the further data elements likewise come from the sender without using the complex conventional authentication, in particular for each data element.

Figure 7:
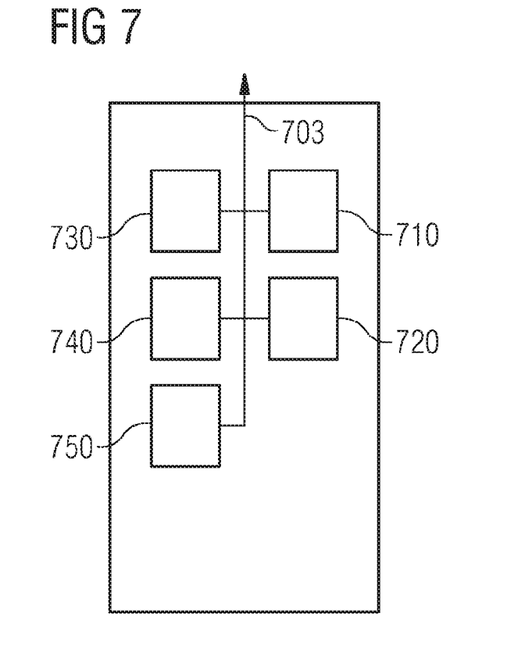
FIG. 7 shows a generation apparatus of a fifth exemplary embodiment.

FIG. 7 shows a generation apparatus of a fifth exemplary embodiment that implements a method according to embodiments of the invention.

More specifically, FIG. 7 shows a generation apparatus for producing a data stream whose sender is authenticable.

The generation apparatus has a first computation module 710, a first memory module 720, a first transmission module 730, a second memory module 740 and a second transmission module 750, which are communicatively connected to one another via a first bus 703. The generation apparatus can additionally also have a further memory apparatus and/or a processor, which is likewise connected to the modules via the bus 703. The generation apparatus may be a sender, in particular in the form of a server, for example, or the generation apparatus may be a component of the server. By way of example, the server additionally comprises a display device in the form of a monitor and/or input devices in the form of a computer mouse and/or a keyboard.

More specifically, the first computation module 710 is designed for computing at least one first piece of authentication information, wherein the at least one first piece of authentication information is generated from a respective first piece of validation information by means of a cryptographic one way function.

The first memory module 720 stores the at least one first piece of authentication information in a respective first data element of the data stream.

The first transmission module 730 transmits the respective first data element to at least one receiver.

The second memory module 740 stores the respective first piece of validation information in a respective second data element of the data stream.

The second transmission module 750 transmits the respective second data element to the at least one receiver.

Figure 8:
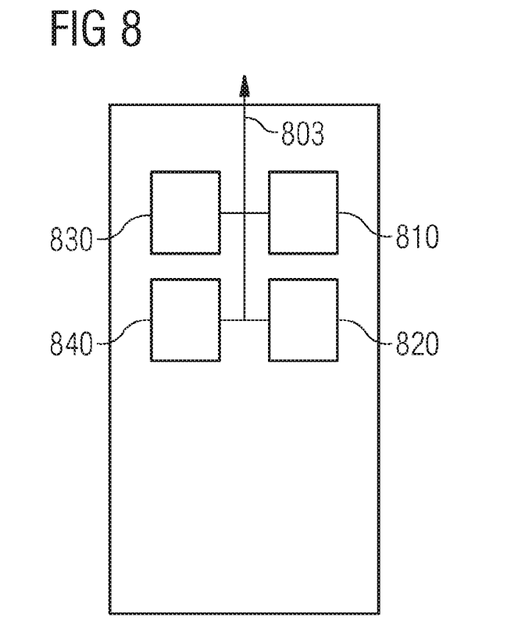
FIG. 8 shows an authentication apparatus of a sixth exemplary embodiment.

FIG. 8 shows an authentication apparatus of a sixth exemplary embodiment that implements a method according to embodiments of the invention.

More specifically, FIG. 8 shows an authentication apparatus for authenticating a sender of a data stream by means of a receiver. The sender may be a sender that comprises the generation apparatus from FIG. 7, for example.

The authentication apparatus comprises a first reception module 810, a second reception module 820, a second computation module 830 and a first comparison module 840, which are communicatively connected to one another via a second bus 803. The authentication apparatus can additionally also have a further memory apparatus and/or a processor, which is likewise connected to the modules via the bus 703. The authentication apparatus may be a sender, in particular in the form of a client, for example, or the authentication apparatus is a component of the sender. By way of example, the client additionally comprises a display device in the form of a monitor and/or input devices in the form of a computer mouse and/or a keyboard.

More specifically, the first reception module 810 is designed for receiving at least one first data element of the data stream, wherein the at least one first data element comprises a respective first piece of authentication information.

The second reception module 820 receives at least one second data element of the data stream, wherein the at least one second data element comprises a respective first piece of validation information for the respective first piece of authentication information.

The second computation module 830 computes a respective first piece of local authentication information, wherein the respective first piece of local authentication information is generated from the respective first piece of validation information by means of a cryptographic one way function.

The first comparison module 840 compares the respective first piece of local authentication information with the respective first piece of authentication information, wherein the sender is authenticated if the respective first piece of local authentication information and the respective first piece of authentication information have sufficient concordance.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for producing a data stream having a plurality of data elements whose sender is authenticable, comprising:
computing at least one first piece of authentication information, wherein the at least one first piece of authentication information is generated from a respective first piece of validation information by means of a cryptographic one way function, wherein the first piece of validation information is one of a random number, a nonce, and/or a continuously incremented or decremented number;
storing the at least one first piece of authentication information in a respective first data element of the plurality of data elements of the data stream;
transmitting the respective first data element having the at least one first piece of authentication information to a plurality of receivers in a broadcast communication;
computing at least one second piece of authentication information, wherein the at least one second piece of authentication information is generated from a respective second piece of validation information by means of the cryptographic one way function;
storing the respective first piece of validation information in a respective second data element of the plurality of data elements of the data stream;
storing the at least one second piece of authentication information in the respective second data element of the data stream;
storing the respective second piece of validation information in a respective third data element of the data stream; and
transmitting the respective second data element having the respective first piece of validation information to the plurality of receivers in the broadcast communication in succession and with staggered timing after transmitting the respective first data element to the plurality of receivers; and
transmitting the respective third data element having the respective second piece of validation information to the plurality of receivers in the broadcast communication in succession and with staggered timing after transmitting the respective first data element and the second data element, wherein the respective first data element and the respective second data element and the respective third data element are transmitted via a same data transmission channel.

2. The method as claimed in claim 1, wherein:
one of the data elements comprises at least two pieces of authentication information; and
respective different data elements comprise an associated piece of validation information for the at least two pieces of authentication information.

3. The method as claimed in claim 1, wherein:
further pieces of authentication information are computed in accordance with the at least one first piece of authentication information;
the further pieces of authentication information and respective further pieces of validation information are stored and transmitted in the respective third data element and/or further data elements of the data stream; and
the storing and transmitting of the further pieces of authentication information and of the respective further pieces of validation information is effected in accordance with the storing and transmitting of the first data element and the second data element and/or the storing and transmitting of the second data element and the third data element.

4. The method as claimed in claim 1, wherein:
the first data element comprises a first checksum for at least one portion of the first data element; and
the second data element comprises a first secret for a check on the first checksum.

5. A method for authenticating a sender of a data stream having a plurality of data elements by means of a receiver, comprising:
receiving at least one first data element of the plurality of data elements of the data stream, wherein the at least one first data element comprises a respective first piece of authentication information;
receiving at least one second data element of the plurality of data elements of the data stream in succession and with staggered timing after receiving the at least one first data element of the data stream, wherein the at least one second data element comprises a respective first piece of validation information for the respective first piece of authentication information and at least one second piece of authentication information, wherein the first piece of validation is one of a random number, a nonce, and/or a continuously incremented or decremented number, wherein the at least one first data element and the at least one second data element are received via a same data transmission channel;
receiving a third data element of the plurality of data elements of the data stream in succession and with staggered timing after receiving the at least one second data element of the data stream, wherein the at least one third data element comprises a respective second piece of validation information;
computing a respective first piece of local authentication information, wherein the respective first piece of local authentication information is generated from the respective first piece of validation information by means of a cryptographic one way function; computing a respective second piece of local authentication information, wherein the respective second piece of local authentication information is generated from the respective second piece of validation information by means of the cryptographic one way function; and comparing at least one of:
- the respective first piece of local authentication information with the respective first piece of authentication information, and
- the respective second piece of local authentication information with the respective second piece of authentication information, wherein the sender is authenticated if at least one of:
- the respective first piece of local authentication information and the respective first piece of authentication information have concordance, and
- the respective second piece of local authentication information and the respective second piece of authentication information have concordance.

6. The method as claimed in claim 5, wherein:
the data elements comprise at least two pieces of authentication information; and
respective different data elements comprise an associated piece of validation information for the at least two pieces of authentication information;
a respective further piece of local authentication information is computed for the respective associated piece of validation information in accordance with the computing of the respective first piece of local authentication information; and
the at least two pieces of authentication information are compared with the respective further pieces of local authentication information in accordance with the comparing of the respective first piece of local authentication information with the respective first piece of authentication information.

7. The method as claimed in claim 5, wherein:
the at least one third data element and/or further data elements comprises a respective further piece of authentication information;
a respective second piece of local authentication information is computed for the respective further piece of authentication information in accordance with the computing of the respective first piece of local authentication information; and
the respective further piece of authentication information is compared with the respective second piece of local authentication information thereof in accordance with the comparing of the respective first piece of local authentication information with the respective first piece of authentication information.

8. The method as claimed in claim 5, wherein:
the first data element comprises a first checksum for at least one portion of the first data element;
the second data element comprises a first secret; and
an integrity of the at least one portion of the first data element is checked on the basis of the first checksum and the first secret.

9. A computer program product, comprising a computer readable hardware storage device having computer readable program code stored therein, said program code executable by a processor of a computer system to implement a method having program commands for performing the method as claimed in claim 1.

10. A provision apparatus for the computer program product comprising a computer readable hardware storage device having computer readable program code stored therein, said program code executable by a processor of a computer system to implement the computer program product as claimed in claim 9, wherein the provision apparatus stores and/or provides the computer program product.

11. A generation apparatus for producing a data stream having a plurality of data elements whose sender is authenticable, comprising:
- a processor configured to compute at least one first piece of authentication information and at least one second piece of authentication information, wherein the at least one first piece of authentication information is generated from a respective first piece of validation information by means of a cryptographic one way function, wherein the first piece of validation is one of a random number, a nonce, and/or a continuously incremented or decremented number, wherein the at least one second piece of authentication information is generated from a respective second piece of validation information by means of the cryptographic one way function, wherein the second piece of validation is one of a random number, a nonce, and/or a continuously incremented or decremented number;
- a first memory module for storing the at least one first piece of authentication information in a respective first data element of the plurality of data elements of the data stream
- a second memory module for storing the at least one second piece of authentication information in a respective second data element of the plurality of data elements of the data stream;
- a first transmission module for transmitting the respective first data element to a plurality of receivers in a broadcast communication;
- a second memory module for storing the respective first piece of validation information in a respective second data element of the plurality of data elements of the data stream;
- a second transmission module for transmitting the respective second data element to the plurality of receivers in the broadcast communication in succession and with staggered timing after the first transmission module has transmitted the respective first data element to the plurality of receivers in the broadcast communication;
- a third memory module for storing the respective second piece of validation information in a respective third data element of the plurality of data elements of the data stream; and
- a third transmission module for transmitting the respective third data element to the plurality of receivers in the broadcast communication in succession and with staggered timing after the second transmission module has transmitted the respective second data element to the plurality of receivers in the broadcast communication, wherein the respective first data element and the respective second data element and the respective third data element are transmitted via the same data transmission channel.

12. A system comprising:
- a first communication partner, having a generation apparatus as claimed in claim 11; and
- at least one second communication partner, having an authentication apparatus, wherein the first communication partner and the second communication partner are communicatively connected to one another via a communication network.

13. A computer program product comprising a computer readable hardware storage device having computer readable program code stored therein, said program code executable by a processor of a computer system to implement a method having program commands for a production device that is configured by means of the program commands to produce the generation apparatus as claimed in claim 11.

14. An authentication apparatus for authenticating a sender of a data stream having a plurality of data elements by means of a receiver, comprising:

- a first reception module for receiving at least one first data element of the plurality of data elements of the data stream, wherein the at least one first data element comprises a respective first piece of authentication information;
- a second reception module for receiving at least one second data element of the plurality of data elements of the data stream in succession and with staggered timing after the first reception module has received the at least one first data element of the plurality of data elements of the data stream, wherein the at least one second data element comprises a respective first piece of validation information for the respective first piece of authentication information, wherein the first piece of validation is one of a random number, a nonce, and/or a continuously incremented or decremented number;
- a third reception module for receiving at least one third data element of the plurality of data elements of the data stream in succession and with staggered timing after the second reception module has received the at least one second data element of the plurality of data elements of the data stream, wherein the at least one third data element comprises a respective second piece of validation information for the respective second piece of authentication information, wherein the second piece of validation is one of a random number, a nonce, and/or a continuously incremented or decremented number, wherein the at least one first data element and the at least one second data element and the at least one third data element are received via a same data transmission channel;
- a first processor configured to compute a respective first piece of local authentication information, wherein the respective first piece of local authentication information is generated from the respective first piece of validation information by means of a cryptographic one way function,
- a second processor configured to compute a respective second piece of local authentication information, wherein the respective second piece of local authentication information is generated from the respective second piece of validation information by means of a cryptographic one way function,
- wherein at least one of the second processor or a further processor of the authentication apparatus is configured to at least one of:
  - compare the respective first piece of local authentication information with the respective first piece of authentication information, and
  - compare the respective second piece of local authentication information with the respective second piece of authentication information,
- wherein the sender is authenticated if at least one of:
  - the respective first piece of local authentication information and the respective first piece of authentication information have concordance, and
  - the respective second piece of local authentication information and the second piece of authentication information have concordance.

* * * * *